United States Patent

[11] 3,583,516

| [72] | Inventors | David L. Spanjer;<br>Niels A. Jaul, both of Willowdale, Ontario, Canada |
|---|---|---|
| [21] | Appl. No. | 803,771 |
| [22] | Filed | Mar. 3, 1969 |
| [45] | Patented | June 8, 1971 |
| [73] | Assignee | Massey-Ferguson Inc.<br>Des Moines, Iowa |

[54] VARIABLE RATIO POWER STEERING
3 Claims, 6 Drawing Figs.

[52] U.S. Cl.............................................. 180/79.2,
60/52, 74/498
[51] Int. Cl............................................... B62d 5/10
[50] Field of Search.......................................... 180/78.2;
60/525; 74/498

[56] References Cited
UNITED STATES PATENTS
| 1,992,440 | 2/1935 | Parker........................... | 74/498 |
| 2,973,658 | 3/1961 | Bishop........................... | 74/498X |
| 3,312,301 | 4/1967 | Hagen............................ | 180/79.2(B) |
| 3,365,977 | 1/1968 | Trocme.......................... | 74/498 |

*Primary Examiner*—A. Harry Levy
*Attorney*—Gerhardt, Greenlee & Farris

ABSTRACT: An articulated vehicle has hydraulic steering jacks which receive hydraulic fluid through a steering control valve. The valve is operated by a steering wheel through a variable-ratio control device. This device comprises a steering wheel mounted lever which is connected through pin and slot means to a lever which is connected to the steering control valve. The positioning of the pin and slot means relative to the lever pivot points is controlled by cam means operated by a selector. Variable positioning of the pin and slot means enables a predetermined increment of movement of the steering wheel to effect a selectively variable increment of movement of the steering control valve. The vehicle operator can easily select "fast" and "slow" steering rates to accommodate varying needs of the vehicle.

INVENTORS
DAVID L. SPANJER
BY NIELS A. TAUL

Tweedale & Gerhardt
ATTORNEYS

INVENTORS
DAVID L. SPANJER
BY NIELS A. TAUL

Tweedale & Gerhardt
ATTORNEYS

INVENTORS
DAVID L. SPANJER
BY NIELS A. TAUL

Tweedale & Gerhardt
ATTORNEYS

VARIABLE RATIO POWER STEERING

This invention relates generally to vehicle-steering systems and more particularly to a steering rate control for vehicles designed for such offroad use as construction, mining, and logging.

When vehicles of this type are being worked, it is generally desirable to operate at a relatively low speed, and rapid response, or "fast" steering rate, is desirable to provide for optimum vehicle maneuverability. However, when these vehicles are "roaded," higher speeds are used. Particularly in articulated frame steering vehicles, the use of a fast steering rate at high travel speeds can be dangerous, inasmuch as a small increment of steering wheel movement usually effects a rapid change of direction.

Many vehicles of this type are provided with a variable-rate power steering which uses a flow divider valve to vary the steering rates. Such steering systems are very effective but are characterized by excessive heating of the hydraulic steering fluid.

It is therefore an object of this invention to provide variable-rate steering wherein the hydraulic steering fluid is not excessively heated.

In a preferred form, this invention consists of a vehicle having ground-engaging means, fluid power steering means for controlling the ground-engaging means to steer the vehicle and including a control valve, a movable manual operator, and valve control means interconnecting the manual operator and the control valve including a control member for controlling the valve, variable connecting means operably interconnecting the manual operator and control member to effect vehicle steering at a predetermined rate in response to a predetermined increment of movement of the manual operator, and selector means for varying the connecting means to selectively vary the vehicle-steering rate in response to the predetermined increment of movement of the manual operator.

These further objects and features of this invention will become readily apparent upon reference to the following detailed description of the attached drawings, wherein.

Figure 1:
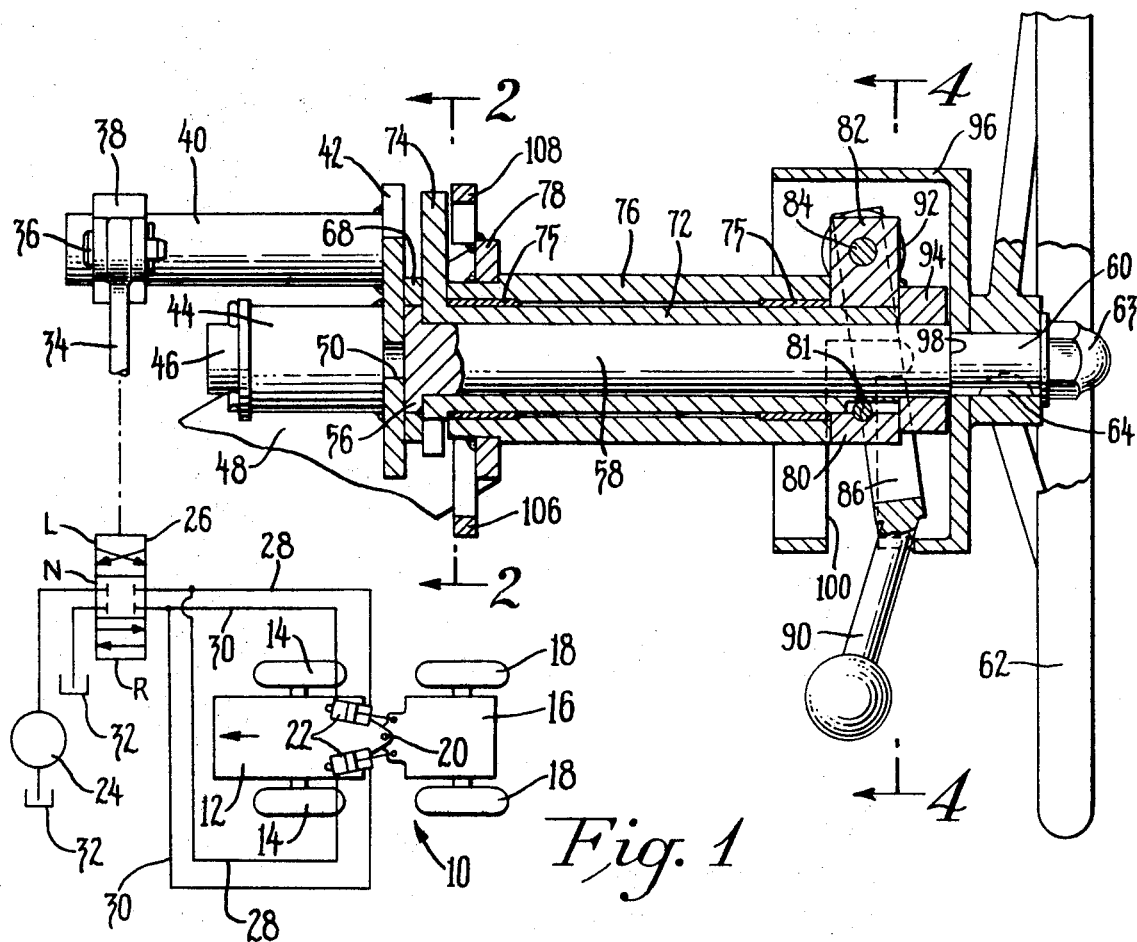
FIG. 1 is a sectional elevational view of a vehicle steering rate control according to this invention, shown schematically connected to a vehicle power steering system.

Referring now to FIG. 1 of the drawings, an articulated vehicle 10 comprises a front section 12 having wheels 14 and a rear section 16 having wheels 18. The front and rear sections are pivoted together at 20 and are interconnected by hydraulic jacks 22 which steer the vehicle by articulating the front section 12 relative to the rear section 16 about pivot 20.

The jacks 22 are supplied with hydraulic fluid from a pump 24 through a steering control valve 26 and lines 28 and 30. Valve 26 is a conventional spring-centered three-position type. Movement of valve 26 from the neutral position N to the lower position R will pressurize lines 28 and drain lines 30 to sump 32, causing the vehicle 10 to articulate and steer to the right. If valve 26 is moved to the upper position L, lines 30 are pressurized and lines 28 are drained to sump 32 to steer to the left.

Figure 2:
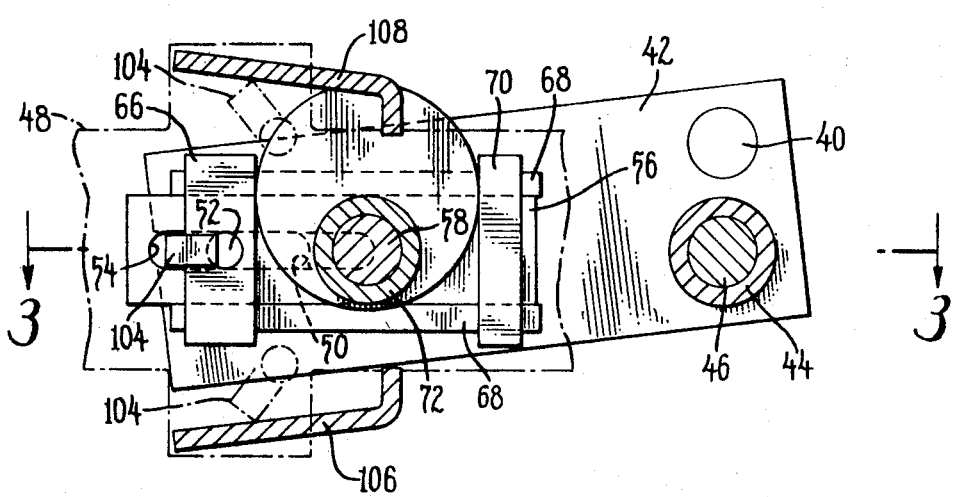
FIG. 2 is a sectional view taken generally along line 2–2 of FIG. 1.

Referring now to FIGS. 1 and 2, control valve 26 is operated by reciprocation of a control rod 34 which is pivoted by a pin 36 to a bifurcated arm 38 that is pivoted to one end of a control shaft 40. The other end of shaft 40 is rigidly attached to one end of an output lever 42 having a collar 44 which is journaled to a shaft 46 secured to a body bracket 48, FIG. 3.

Figure 5:
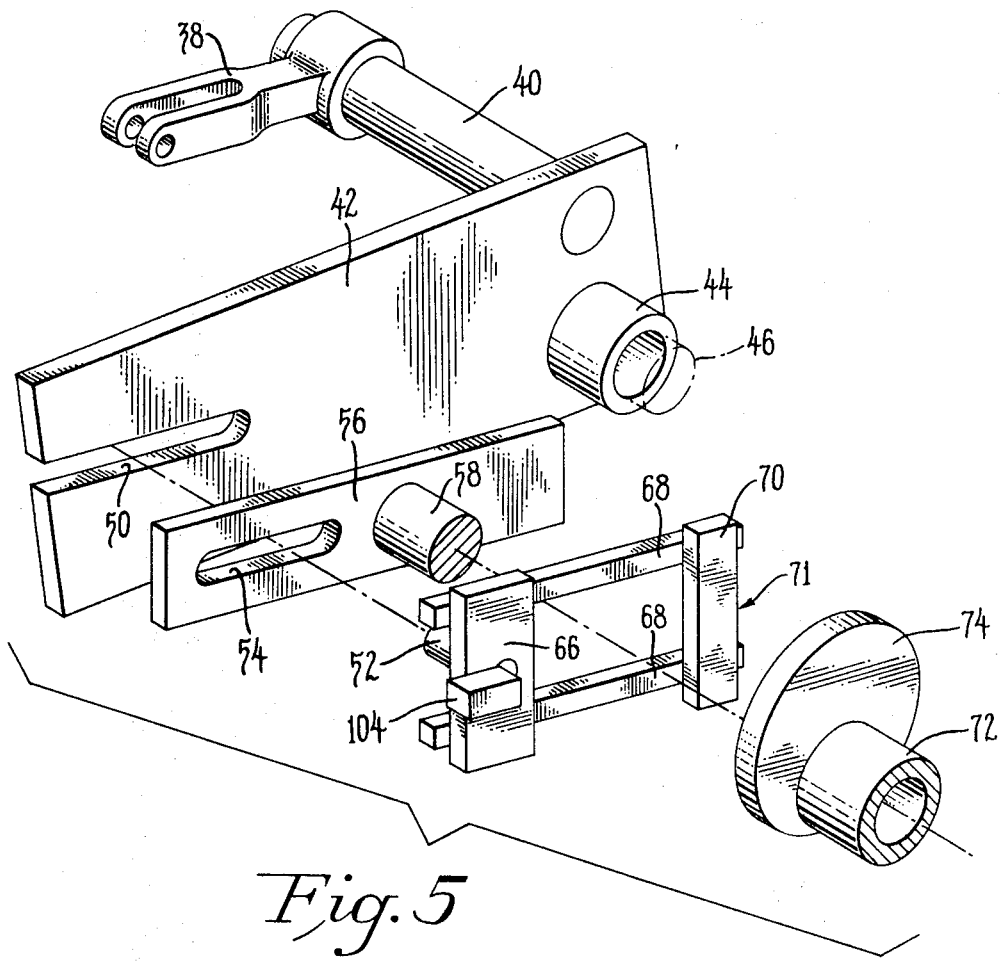
FIG. 5 is an exploded perspective view of the vehicle steering rate control.

At its free end, lever 42 includes an inclined open-ended slot 50 which receives the free end of a connecting pin 52, as best seen in FIG. 5, Pin 52 also projects through a closed end slot 54 formed in an input lever 56 which is attached at a spaced point to a shaft 58. As best shown in FIG. 1, the shaft 58 extends rearwardly from lever 56 to a reduced diameter portion 60 which mounts a manually operated steering wheel 62 through a bolt 63 and a key 64. This arrangement operably connects steering wheel 62 with valve 26 through shaft 58, lever 56, pin 52, lever 42, shaft 40, arm 38, and rod 34. Rotation of steering wheel 62 through a predetermined increment of movement will cause a predetermined increment of movement of valve 26 and a predetermined articulation of vehicle 10 to give a predetermined steering rate. Means for varying the steering rate will now be described with particular reference to FIGS. 2 and 5.

Pin 52 is rigidly mounted on a vertical bar 66 which mounts one end of a pair of lateral arms 68. The other ends of arm 68 are interconnected by a vertical bar 70, thereby forming a rigid rectangular slide structure 71 slidable on lever 56. Shaft 58 journals an elongated tube 72 which mounts an eccentric cam 74 at its inner end. The cam 74 is confined between bars 66 and 70. Thus rotation of cam 74 will slide structure 71 on lever 56 radially with respect to shaft 58. This moves pin 52 radially of shaft 58 in the slots 50 and 54 to change the distance between the pin 52 and the lever pivots 58 and 46 and vary the effective lever arms of levers 56 and 42.

Figure 3:
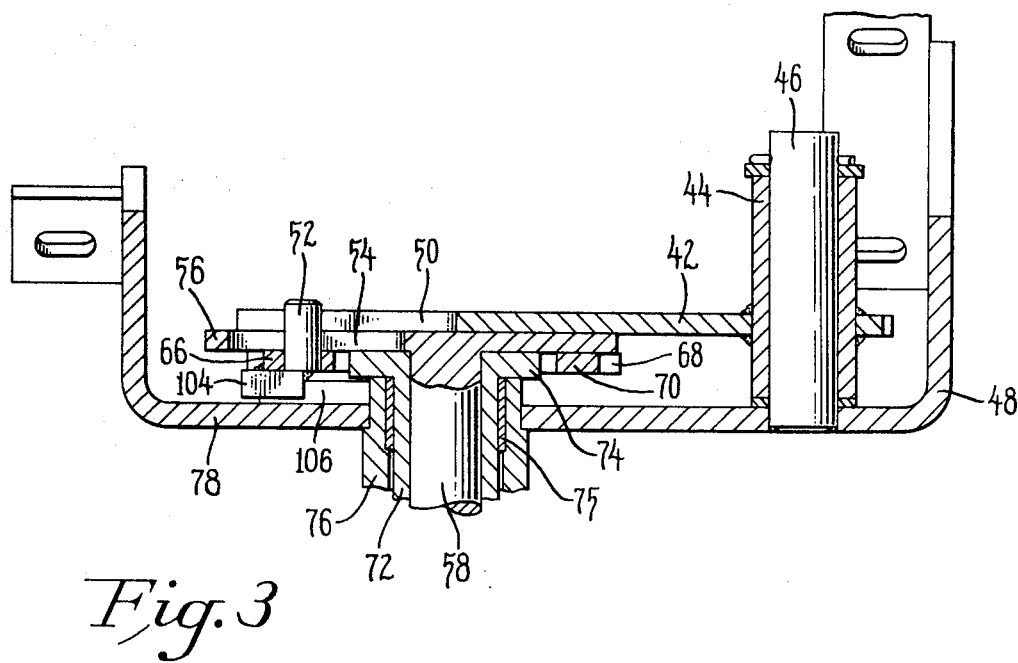
FIG. 3 is a sectional view taken generally along line 3–3 of FIG. 2.
Figure 4:
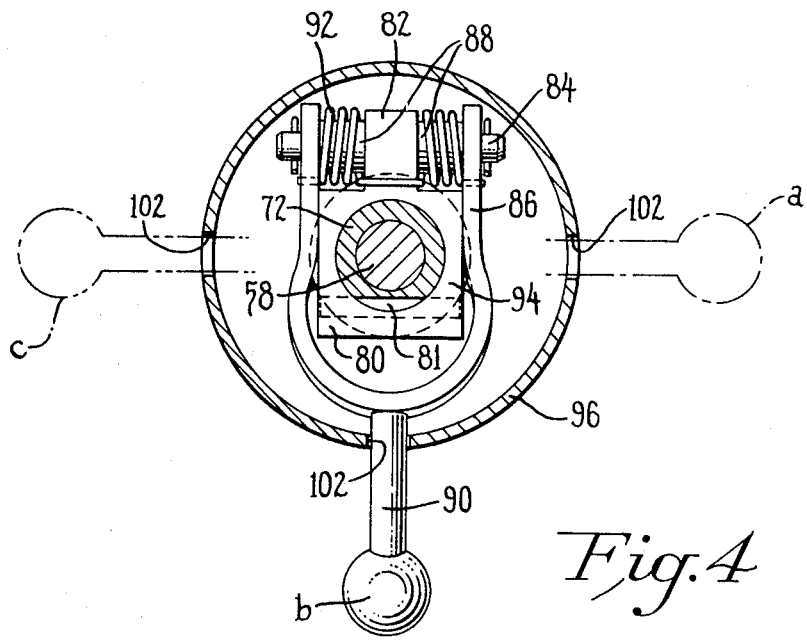
FIG. 4 is a sectional view taken generally along line 4–4 of FIG. 1.

Referring now to FIGS. 1 and 3, tube 72 is journaled through bushings 75 on a mast jacket 76 which is rigidly attached to a horizontal plate 78 of the bracket 48. As shown in FIGS. 1 and 4, at its outer end, tube 72 mounts a rectangular block 80, through a pin 81. Block 80 has an upstanding apertured projection 82 that carries a pin 84. At its outer ends, a pin 84 mounts a horseshoe-shaped bracket 86 which is spaced from projection 82 by bushings 88 and has a depending handle 90. A coil spring 92 encircles bushings 88, centrally embraces projection 82, and has ends which engage the ends of bracket 86 to bias handle 90 outwardly or counterclockwise, as viewed in FIG. 1. A spacer block 94 is mounted on shaft 58. In the FIG. 1 position, bracket 86 couples tube 72 to shaft 58, as will now be described.

An open-ended cylindrical shroud 96 is secured between the steering wheel 62 and the shoulder 98 of shaft 58 for rotation therewith. The shroud 96 includes an arcuate slot 100 having 90° spaced-apart detent notches 102. As shown in FIG. 4, the notches 102 provide for positive location of handle 90 in three positions denoted $a, b, c$ to lock tube 72 to shaft 58 for rotation therewith.

Figure 6:
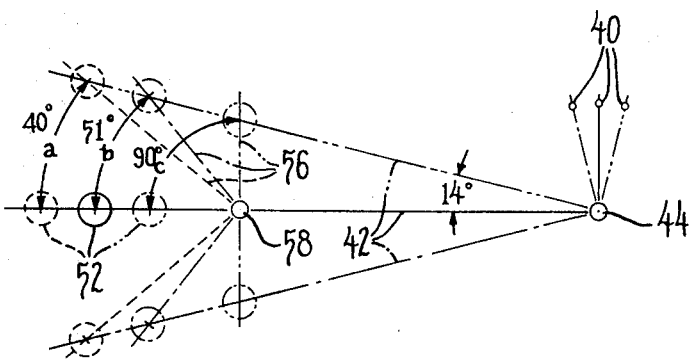
FIG. 6 is a diagrammatic representation of the operation of the vehicle-steering rate control.

Operation of the device will now be explained. As previously noted, rotation of steering wheel 62 will cause lever 56 to pivot lever 42 through pin 52 and effect movement of valve 26 through shaft 40, arm 38 and rod 34. With handle 90 in the solid line position shown in FIGS. 1 and 4, cam 74 is in the FIG. 2 position which locates pin 52 relative to levers 56 and 42 as illustrated in the solid line position $b$ shown diagrammatically in FIG. 6. Rotation of steering wheel 62 in either direction is limited by engagement of stop 104 mounted on bar 66 with flanges 106 and 108 of bracket 48. The flanges 106 and 108 are located to limit movement of lever 42 to 14° from neutral, which corresponds to the limit of movement of valve 26. In position $b$, it is necessary to rotate steering wheel 62 through a 51° arc to pivot lever 42 through 14°. This provides the vehicle with an intermediate rate of steering.

If a faster rate of steering is desired, handle 90 is depressed into slot 100 to disengage bracket 86 from shroud 96. Handle 90 is then rotated counterclockwise 90° to position $a$ shown in FIG. 4. Upon release, handle 90 enters a dent notch 102 as bracket 86 again engages shroud 96 to lock tube 72 to shaft 58. This will rotate cam 74 counterclockwise and move pin 52 radially outwardly of shaft 58 to the position $a$ of FIG. 6. As shown there, rotation of steering wheel 62 through only 40° will pivot lever 42 the maximum 14°. This fast rate of steering provides better maneuverability for the vehicle 10.

When a slower rate of steering is desired, handle 90 is again depressed into slot 100 to disengage tube 72 from shaft 58.

Handle 90 is then rotated clockwise to position c, as shown in FIG. 4. This pivots cam 74 clockwise and slides pin 52 radially toward shaft 58 to position c shown in FIG. 6. To effect the 14° movement of lever 42, steering wheel 62 must be rotated 90°. This slow steering rate is suitable for roading of the vehicle since it gives more precise control.

Thus the steering rate of the vehicle may be selectively varied so that movement of the steering wheel through a predetermined increment of movement will effect a selectively variable increment of movement of the steering valve. This arrangement eliminates the need for a flow divider valve and eliminates the excessive heating of hydraulic fluid caused thereby.

While a preferred embodiment of this invention has been shown and described, many modifications are contemplated. For example, other cam means could be substituted, more or different steering rates could be provided, and different connecting means and geometry could be substituted for those illustrated and are contemplated within the scope of this invention.

We claim:

1. In combination with a vehicle having ground-engaging means, fluid power steering means for controlling the ground-engaging means to steer the vehicle and including a control valve, and a movable manual operator including a first lever pivoted to the vehicle at a first point, valve control means operably interconnecting the manual operator and the control valve, including: a second lever pivoted to the vehicle at a spaced second point for controlling the valve, variable connecting means including a pin carried by one lever engaging a slot on the other lever at a spaced third point so that a predetermined increment of first lever movement causes a sliding of the pin in the slot to effect a predetermined increment of second lever movement to steer the vehicle at a predetermined rate in response to a predetermined increment of movement of the manual operator, and selector means for moving the pin relative to the slot to vary the distance between the third point and the first and second points and change the increment of second lever movement effected by the increment of the first lever movement to selectively vary the vehicle-steering rate.

2. The combination of claim 1, wherein: the selector means include a cam follower mounting the pin on the one lever and a cam for moving the cam follower.

3. The combination of claim 2, wherein: the cam is eccentrically mounted on the first lever for rotation therewith and for selective rotation relative thereto, and the follower is mounted for rotation with the first lever and for radial sliding movement relative thereto in response to cam movement to vary the radial spacing of the pin from the first lever pivot point.